(12) United States Patent
Sakamoto et al.

(10) Patent No.: US 6,411,515 B1
(45) Date of Patent: Jun. 25, 2002

(54) AMPLIFIER

(75) Inventors: Yuzuru Sakamoto; Tetsufumi Takayasu; Masuo Shiratori, all of Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 09/820,355

(22) Filed: Mar. 29, 2001

(30) Foreign Application Priority Data

Sep. 26, 2000 (JP) ........................................ 2000-292283

(51) Int. Cl.⁷ ................................................ H05K 7/20

(52) U.S. Cl. ...................... 361/704; 361/679; 361/688; 361/689; 361/690; 361/707; 361/721; 361/725; 174/16.1; 174/16.3; 174/17 R; 174/17 CT; 174/58; 165/80.3; 165/185; 312/223.2

(58) Field of Search ................................ 361/610, 679, 361/687, 688, 704, 707, 724, 725, 729, 730; 174/16.3, 17 R, 58; 165/80.3, 185; 312/223.2; 211/96, 115; 454/184

(56) References Cited

U.S. PATENT DOCUMENTS

| | | | | |
|---|---|---|---|---|
| 3,997,819 A | * | 12/1976 | Eggert et al. | 361/704 |
| 5,267,122 A | * | 11/1993 | Glover et al. | 361/704 |
| 5,444,868 A | * | 8/1995 | Reynolds et al. | 455/89 |
| 5,476,316 A | * | 12/1995 | Batroney et al. | 312/287 |
| 5,625,531 A | * | 4/1997 | Padilla et al. | 361/623 |
| 5,721,396 A | * | 2/1998 | Daoud | 174/59 |
| 5,930,113 A | * | 7/1999 | McCann | 361/704 |
| 6,201,878 B1 | * | 3/2001 | Azima et al. | 381/386 |

\* cited by examiner

Primary Examiner—Leo P. Picard
Assistant Examiner—Boris L. Chervinsky
(74) Attorney, Agent, or Firm—Wenderoth, Lind & Ponack, L.L.P.

(57) ABSTRACT

An amplifier for a portable telephone of the like is repaired or replaced without loss of an amplifying function even when the amplifier malfunctions. A plurality of door-shaped amplifier parts are provided on the left and right sides of an amplifier box. The left and right door-shaped amplifier parts can be mounted on opposite sides to each other. One amplifier part is in service and the other amplifier part is a backup. In a case where the amplifier part in service malfunctions, the other amplifier part is used or is mounted for use on the opposite side.

10 Claims, 4 Drawing Sheets

AMPLIFIER

BACKGROUND OF THE INVENTION

1. Field of the Invention

The present invention relates to an amplifier and, for example, to an outdoor type amplifier placed on the top of a telephone pole and used for a radio communication system for a portable telephone.

2. Description of the Related Art

An outdoor type amplifier, which is placed at a high position such as on the top of a telephone pole or on the roof of a building, is used for amplifying a radio wave in a portable radio-phone system such as a portable telephone. One example of conventional outdoor type amplifiers placed on the top of a telephone pole is shown in FIG. 4.

This amplifier is composed of an amplifier box 101 and one amplifier part 102 built therein. A door 103 for maintenance and inspection is provided on the front of the amplifier box 101. A rubber packing 104 is provided on the mating face of the door 103 where the door 103 is mated with the amplifier box 101, and the door 103 is closed in the state where the door 103 is mated with the packing 104 by fastening screws 105.

On the back side of the amplifier box 101 is provided a radiator 106 for dissipating heat. On the back of the amplifier box 101 is provided a fixing hardware 107 and by fixing the fixing hardware 107 to a telephone pole or the like with fixing bolts 108, the amplifier is fixed to the telephone pole or the like. A high-frequency connector 109, a signal connector 110, a power source connector 111 and the like are connected to the amplifier part 102 in the amplifier box 101 from the outside.

When the amplifier having the above configuration needs to be dismounted and repaired or replaced, the high-frequency connector 109, the signal connector 110, the power source connector 111 are disconnected and further the fixing bolts 108 are removed and then the whole amplifier is dismounted from the telephone pole.

In the above conventional amplifier, when the amplifier is repaired or replaced, because the amplifier part is one, the amplification function of the amplifier is lost, thereby narrowing the service area of the portable telephone, which results in causing inconvenience to the users of the portable telephone.

SUMMARY OF THE INVENTION

The present invention has been made in view of this problem and the object of the present invention is to provide an amplifier which does not lose its amplification function even when it is repaired or inspected.

An amplifier according to the present invention to solve the above-mentioned problem comprised a box and a plurality of amplifier parts mounted on the box in such a way that they can be opened or closed.

According to the amplifier of the present invention, even in a case where one amplifier part malfunctions, while it is repaired or replaced, the other amplifier part can substitute for the malfunctioning amplifier part.

An amplifier according to the present invention is characterized in that each amplifier part has a radiator in the above-mentioned constitution.

According to the amplifier of the present invention, heat generated by the amplifier part can be dissipated by the radiator.

An amplifier according to the present invention is characterized in that the mating portion of the box and each of the amplifier parts has a waterproof structure in the above-mentioned constitution.

According to the amplifier of the present invention, the mating portion of the box and each of the amplifier parts has a waterproof structure and hence can prevent rain or the like from entering the box to protect the amplifier part.

An amplifier according to the present invention comprises a box and an amplifier part mounted on the box in such a way that it can be opened or closed with a hinge which can be separated and that the amplifier part can be dismounted from the box by separating the hinge.

According to the present invention, when the amplifier part malfunctions because of a failure, it is dismounted from the box and can be readily replaced or repaired.

An amplifier according to the present invention is characterized in that, in the above-mentioned constitution, the hinge is separated into a box side member fixed to the box and an amplifier side member fixed to the amplifier part and that the box side member is fitted in the amplifier side member from below to prevent the amplifier part from dropping.

According to the present invention, in the case where the amplifier is placed at a high position, when the amplifier part is repaired without being dismounted from the box, even if the amplifier part is opened, the amplifier part is prevented from dropping and further can be opened towards the front of a worker, which facilitates repair work.

An amplifier according to the present invention is characterized in that, in the above-mentioned constitution, the amplifier part is a pair of amplifier parts mounted on the a left and right sides of the box such that they can be opened or closed with hinges, wherein each hinge is separated into a box side member fixed to the box and an amplifier side member fixed to the amplifier part, wherein a backup amplifier side member is fixed to a position opposite to the position where the amplifier side member of the amplifier part is fixed, and wherein the amplifier part is selectively mounted on the left side or the right side of the box by selectively fitting the amplifier part side member in service or the backup amplifier part side member in the amplifier part side member.

According to the present invention, an amplifier part dedicated to a right-hand side or a left-hand side is not required since the same amplifier part can be mounted on either side of the box, which results in a reduction in manufacturing cost. Also, when assembling the amplifier part, it is possible to assemble the amplifier part without taking into account the position where the amplifier part is to be mounted, such as right-hand side or a left-hand side, which results in a reduction in work load.

An amplifier according to the present invention comprises a box and an amplifier part mounted on the box in such a way that it can be opened or closed with a hinge having a clearance, wherein a packing made of an elastic material is fixed to the mating portion of the box and the amplifier part and wherein the amplifier part is fixed to the box in a state where the amplifier part is closed with a fastening member for pressing the amplifier part onto the box.

According to the present invention, a packing made of an elastic material for sealing such as rubber, synthetic resin or the like is fixed to the mating portion of the box and the amplifier part to form a waterproof structure for preventing the entry of rain or the like, and if the amplifier part is pressed onto and fixed to the box by the use of a fastening member such as a screw, a clip or the like in a state where the amplifier part is closed, the amplifier part and the box are pressed onto the packing of the mating portion to surely make the mating portion waterproof.

An amplifier according to the present invention comprises a box, and a pair of amplifier parts mounted on the left and right sides of the box in such a way that they can be opened or closed, wherein the left and right amplifier parts can be mounted on the opposite sides. A rubber packing is provided at the mating face of the box and each of the amplifier parts, and a radiator for dissipating heat is provided on the outside of each of the amplifier parts.

According to the amplifier of the present invention, even if one of the left and right amplifier parts malfunctions, while it is repaired or replaced, the other amplifier part can substitute for the malfunctioning amplifier part. Also, according to the amplifier of the present invention, heat generated by the amplifier part is dissipated by the radiator provided on the outside. According to the amplifier of the present invention, the packing provided on the mating portion of the box and the amplifier part can prevent the entry of rain or the like. Further, according to the amplifier parts of the present invention, the amplifier parts can be switched between the left and right amplifier parts. Therefore, when the amplifier part in service malfunctions, it can be replaced with the other amplifier part.

An amplifier according to the present invention is characterized in that, in the above-mentioned constitution, one of the pair of amplifier parts is in service and the other is used as a backup.

Also, an amplifier according to the present invention is characterized in that, in the above-mentioned constitution, the amplifier is placed outdoors at a high position in order to amplify the radio wave of a portable telephone system.

According to the amplifier of the present invention, when the amplifier part now in service malfunctions because of a failure, it can be replaced with the backup amplifier part on standby. Therefore, the operation of a radio communication system using this amplifier can be restored without being stopped for a long time.

DESCRIPTION OF THE PREFERRED EMBODIMENTS

Figure 1:
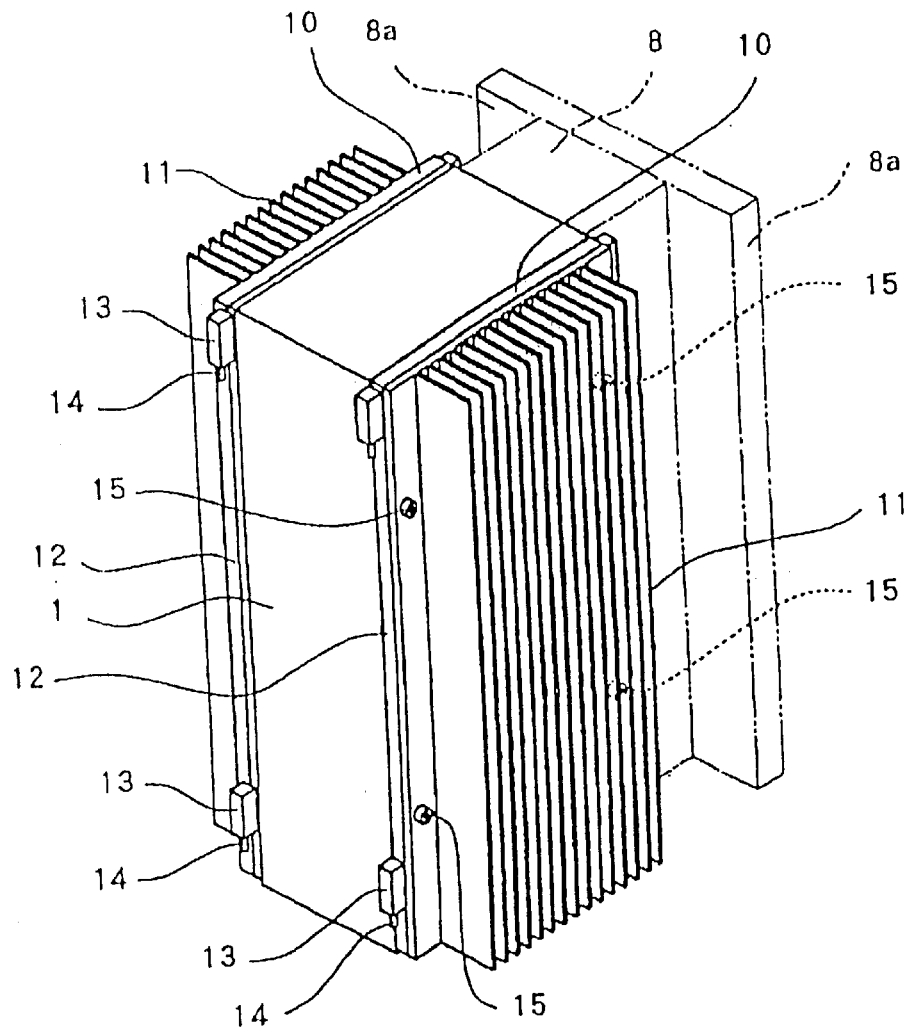
FIG. 1 is a perspective external view of an amplifier according to one preferred embodiment of the present invention.
Figure 2:
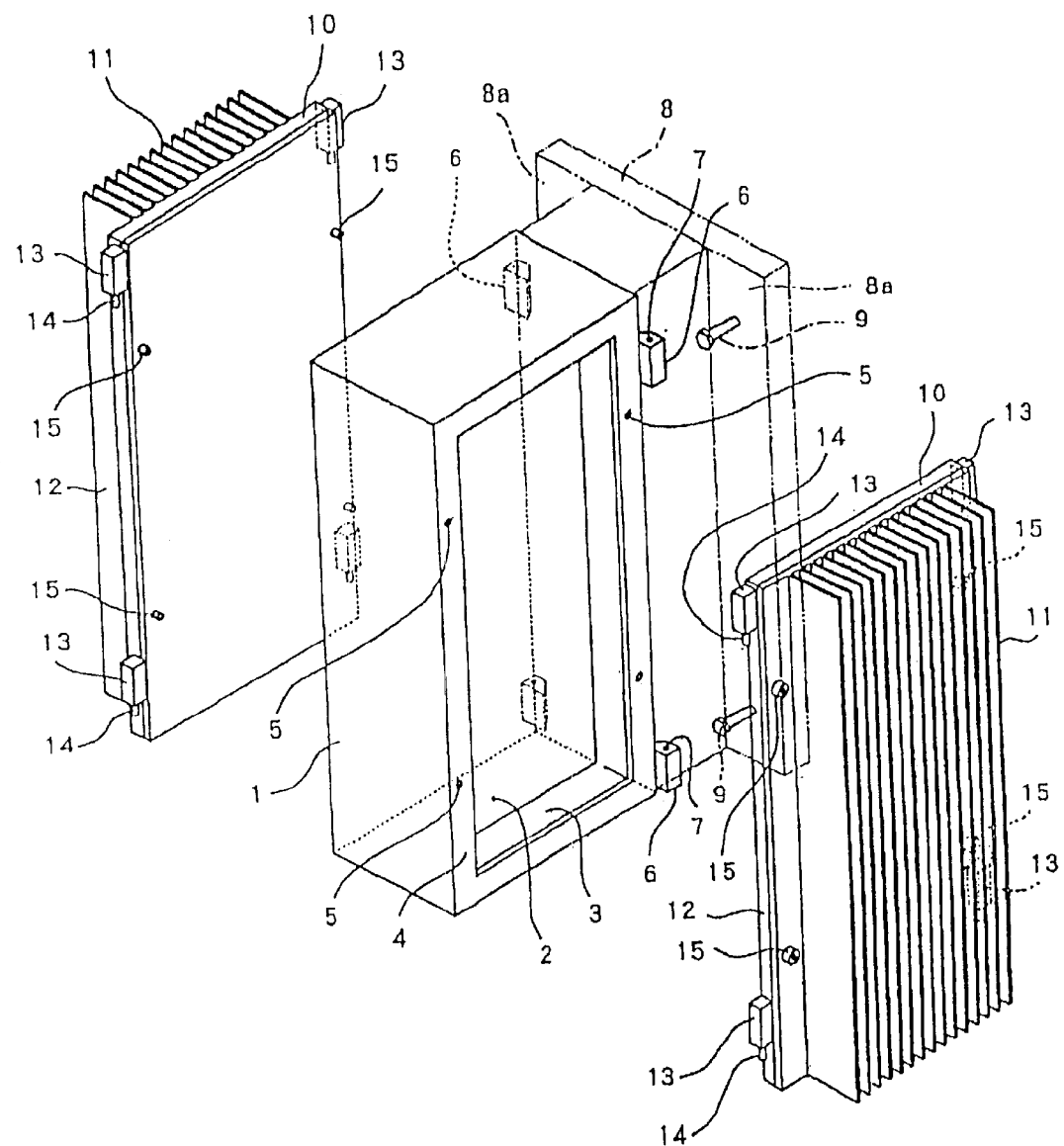
FIG. 2 is an exploded perspective view of one preferred embodiment.
Figure 3:
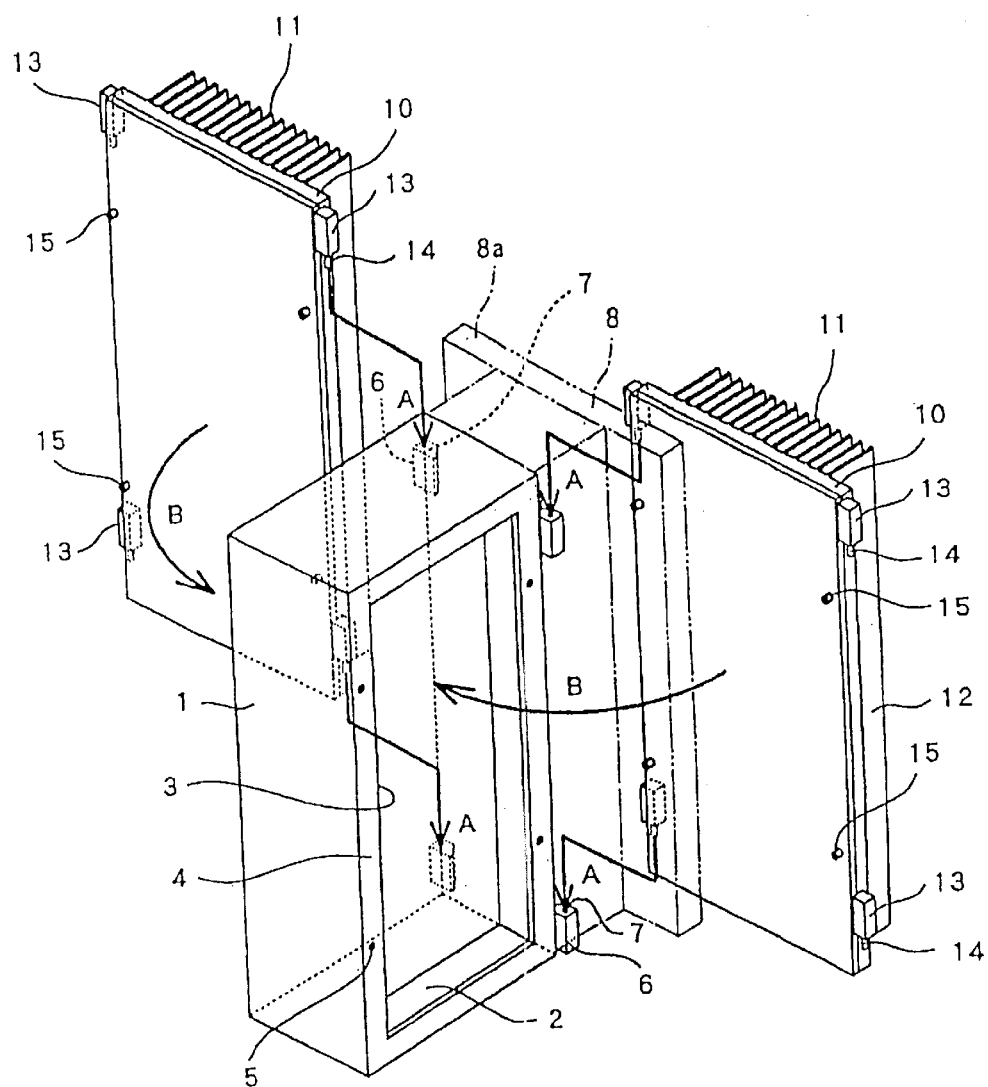
FIG. 3 is a view to show the assembling procedures of one preferred embodiment.
Figure 4:
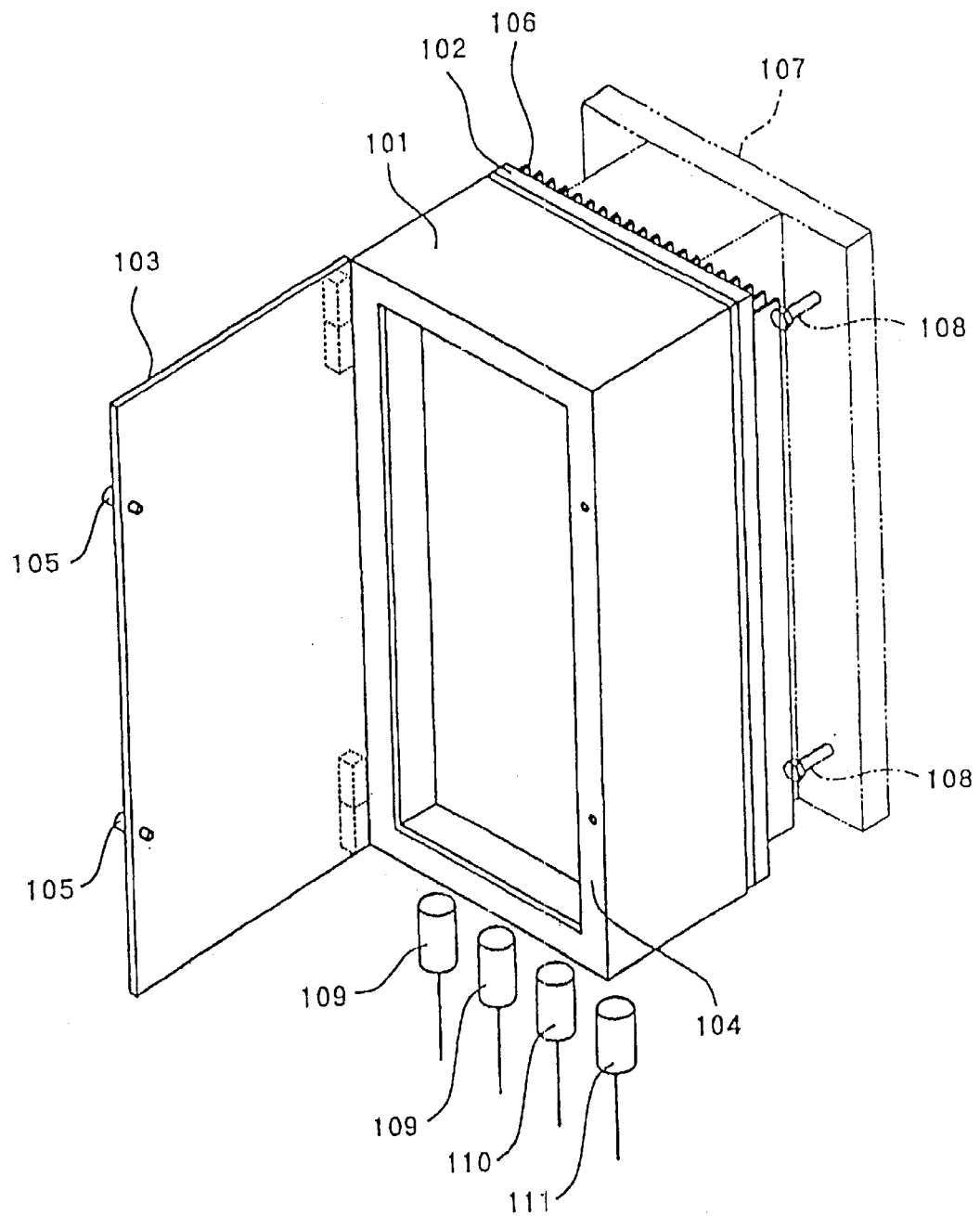
FIG. 4 is a perspective view of one example of conventional amplifiers.

FIG. 1 shows a perspective external view of an amplifier according to one preferred embodiment of the present invention, FIG. 2 shows an exploded perspective external view of one preferred embodiment, and FIG. 3 shows a view to show the assembling procedures of one preferred embodiment.

A box 1 is shaped like a rectangular solid and has a partition wall 2 at the center in the left-right direction (in the direction of width) and spaces 3 on both sides of the partition wall 2. A rubber packing (packing material) 4 is fixed to a rectangular opening end surface (mating portion) of each of the left and right sides of the box 1. Fixing female screw threads (here, four screw threads) 5 are cut in the opening end surface through the rubber packing 4. Receiving blocks (box side members) 6, each of which constitutes one part member of a hinge, are fixed to the upper and lower portions of both the left and right borders on the back side of the box 1. In the receiving block 6 is a hole 7 into which a shaft of a shaft block constitution the other member of the hinge is inserted, as described below.

On the back of the box 1 is fixed a fixing hardware 8 approximately shaped like a letter T. A plate-shaped portion 8a projecting to the left and right sides of the fixing hardware 8 is fixed to a telephone pole or the like with bolts 9.

Each of the respective left and right door-shaped amplifier parts 10 in which an amplifier is built is shaped like a plate. A large number of fins 11 constituting a radiator as a device for dissipating heat are fixed, in parallel in the up and down direction, to the outer surface of the door-shaped amplifier part 10. Shaft blocks (amplifier side members) 13, each of which constitutes the other part member of the hinge, are fixed to the upper and lower portions of both side end faces 12 of the respective left and right door-shaped amplifier parts 10. Each shaft block 13 is provided in a downward direction with a pin 14 to be inserted into the hole 7 of the receiving block 6. The pin 14 of the shaft block 13 is fitted in to hole 7 of the receiving block 6 with a little clearance therebetween. Fixing male screws 15 to be screwed into the fixing female screw threads 5 cut in the box 1 are provided at the positions corresponding to the fixing female screw threads 5 on both sides of the large member of fins 11 fixed to the door-shaped amplifier part 10.

Next, the assembling procedures of the amplifier in accordance with one preferred embodiment is discussed based on FIG. 3.

The pin 14 of each of the upper and lower shaft blocks 13 on the side end of one of the door-shaped amplifier parts 10 is inserted into the hole 7 of each of the upper and lower receiving block 6 on each of the left and right sides of the back of the box 1, as shown by arrows A in FIG. 3. The door-shaped amplifier part 10 is supported by the receiving blocks 6 in the state where the bottom surface of each of the shaft blocks 13 is placed on the top surface of each of the receiving blocks 6, and the hole 7 and the pin 14 inserted thereinto function as a hinge, whereby the door-shaped amplifier part 10 is supported by the receiving blacks 6 from the lower side thereof and is prevented from dropping downward and can be opened or closed with respect to the rubber packing 4 on the opening end face (mating portion) of the box 1.

When the door-shaped amplifier part 10 is closed and the fixing male screws 15 are screwed into the fixing female threads 5, the door-shaped amplifier part 10 is fixed to the box 1 in a state where the door-shaped amplifier part 10 is closed, whereby the opening portion of the box 1 is closed and at the same time the rubber packing 4 is compressed. That is, the opening portion of the box 1 is hermetically closed. Since there is a little clearance between the hole 7 of the receiving block 6 and the pin 14 of the shaft block 13, the rubber packing 4 is uniformly compressed by fastening the fixing male screws 15 to surely make the box 1 waterproof around its periphery.

The amplifier assembled in the above mentioned manner is fixed to a telephone pole or the like. That is, the plate-shaped portion 8a of the fixing hardware 8 amplifier is fixed to the telephone pole side by fastening bolts 9. Also, though not shown, a high-frequency connector, a signal connector, and a power source connector are connected to the box 1 from the bottom side. Here, in the case where one of the left and right door-shaped amplifier parts 10 is used and the other is a backup, the high-frequency connector, the signal connector, and the power source connector are arranged such that they are connected to one of the door-shaped amplifier parts 10. In the case where both the door-shaped amplifier parts 10 are used, the high-frequency connector, the signal connector, and the power source connector are arranged such that they are connected to both of the door-shaped amplifier parts 10.

When the door-shaped amplifier part 10 is repaired or inspected, the fixing male screws 15 of the objective door-shaped amplifier part 10 are removed and the door-shaped amplifier part 10 is opened. The door-shaped amplifier part 10 is supported by the receiving blocks 6 in the state where the bottom surface of each of the shaft blocks 13 is placed on the top surface of each of the receiving blocks 6. Since an inspection and a repair is made to the door-shaped amplifier part 10 in the open state, the work of inspection and repair can be made from the front side of the door-shaped amplifier part 10. In the case where the door-shaped amplifier part 10 is dismounted, in a reverse order to the case where it is mounted, the door-shaped amplifier part 10 is dismounted by moving upward the door-shaped amplifier part 10 and removing the pin 14 of the shaft block 13 from the hole 7 of the receiving block 6.

In the case where only one of the door-shaped amplifier parts 10 is used and the other is a backup, the malfunctioning door-shaped amplifier part 10 is dismounted. For example, in a case where the right-hand door-shaped amplifier part 10 malfunctions, the right-hand door-shaped amplifier part 10 is dismounted and the left-hand door-shaped amplifier part 10, which is the backup, is mounted on the right-hand side. Since the door—shaped amplifier part 10 is provided with the shaft blocks 13 on both sides, it can be mounted on right-hand side of the box 1 by the use of the shaft blocks 13 opposite to the shaft blocks 13 used when the door-shaped amplifier part 10 is mounted to the left side of the box 1. Therefore, the malfunctioning door-shaped amplifier part 10 can be repaired or replaced while the function as an amplifier is continued. Needless to say, a new door-shaped amplifier part 10 for a replacement is mounted on the left-hand side of the box 1 which is made vacant.

Although the door-shaped amplifier parts 10 are mounted on both the left and right sides of the box 1 in the above-mentioned preferred embodiment, another door-shaped amplifier part 10 may be mounted on the front side, that is, three door-shaped amplifier parts 10 may be mounted in total. Further, if the box 1 is fixed to the telephone pole or the like at a center portion, four or more door-shaped amplifier parts 10 can be provided around the box 1.

Although the radiator is composed of a large number of fins arranged in parallel in the up and down direction, the configuration of the radiator is not limited to this type but other radiators of various shapes can be adopted.

Also, as for the receiving block 6 and the shaft block 13 constituting the hinge, the box 1 may be provided with a receiving block having a pin projecting upward and the door-shaped amplifier part 10 may be provided with a block in which a hole is made from the bottom surface. Further, as for a hinge structure, any hinge structure may be adopted in which the door-shaped amplifier part 10 can be opened or closed with respect to the box 1 and be removably mounted on the box 1.

Further, the present invention is not limited to the amplifier for the portable telephone but can be applied to various kinds of amplifiers.

EFFECTS OF THE INVENTION

According to an amplifier of the present invention, a box is provided with a plurality of amplifier parts which are opened or closed. Hence, even if one amplifier part malfunctions, another amplifier part can continue the function of the amplifier if it is operated. Therefore, for example, in the case where the present invention is applied to the amplifier of the portable telephone, even the malfunction of one amplifier part does not result in the occurrence of an event where a service area is narrowed.

According to an amplifier of the present invention, one amplifier is provided with a plurality of amplifier parts and hence, it is not necessary to separately keep many amplifier parts for maintenance and replacement.

According to an amplifier of the present invention, an amplifier part itself is provided with a radiator to dissipate heat and hence it is possible to avoid the malfunction caused by the heat generation of the amplifier. Further, since a box has a waterproof structure, it is possible to prevent rain or the like from entering the box and hence, to protect the amplifier part.

According to an amplifier of the present invention, a box is provided with amplifier parts on both the left and right sides in such a way that they can be opened or closed. Hence, maintenance work can be made directly to the amplifier part from the front side in the state where the amplifier part is opened, which facilitates the maintenance and inspection work of the amplifier part even if the amplifier is placed in a narrow working space such as on a telephone pole or the like. Further, according to amplifier parts of the present invention, it is possible to switch between left and right amplifier parts. Therefore, even if one amplifier part in service malfunctions, it is possible to continue the function of the amplifier by replacing it with the other amplifier part.

What is claimed is:

1. An amplifier comprising:
   a box;
   hinges; and
   a first amplifier part and a second amplifier part having a same function, said first and second amplifier parts being mounted on first and second sides of said box, respectively, via said hinges such that each of said first and second amplifier parts can be opened away from and closed to said box in a door-like fashion, wherein each of said hinges comprises a box side member fixed to said box and an amplifier side member fixed to one of said first and second amplifier parts, and wherein said first and second amplifier parts have said amplifier side members of said hinges located thereon such that said first and second amplifier parts are interchangeable on said first and said second sides of said box, and
   wherein said first and second amplifier parts can be dismounted from said box by separating said hinges.

2. An amplifier according to claim 1, wherein said box side members are fitted to said amplifier side members such that said box side members support said amplifier side members from below to prevent said first and second amplifier parts from dropping.

3. An amplifier according to claim 1, further comprising a fixing hardware attached to a back of said box, said fixing hardware being T-shaped.

4. An amplifier according to claim 1, wherein said box has a bottom side, said bottom side of said box being operable to receive a plurality of connectors.

5. An amplifier comprising:

a box having mating portions;

hinges;

a first amplifier part and a second amplifier part having a same function, said first and second amplifier parts being mounted on first and second sides of said box, respectively, via said hinges such that each of said first and second amplifier parts can be opened away from and closed to said box in a door-like fashion, wherein each of said hinges comprises a box side member fixed to said box and an amplifier side member fixed to one of said first and second amplifier parts, and wherein said first and second amplifier parts have said amplifier side members of said hinges located thereon such that said first and second amplifier parts are interchangeable on said first and said second sides of said box;

a packing material comprising an elastic material, said packing material being fixed to said mating portions of said box; and fastening members operable to fix said first and second amplifier parts to said mating portions of said box when said first and second amplifier parts are closed to said mating portions of said box.

6. An amplifier according to claim 5, wherein said box has a bottom side, said bottom side of said box being operable to receive a plurality of connectors.

7. An amplifier comprising:

a box having a first side, a second side, and mating portions;

a first amplifier part mounted on said first side of said box such that said first amplifier part can be opened away from and closed to one of said mating portions of said box in a door-like fashion;

a second amplifier part mounted on said second side of said box such that said second amplifier part can be opened away from and closed to another of said mating portions of said box in a door-like fashion;

a rubber packing being located on said mating portions of said box; and a radiator being provided on an outside of each of said first and second amplifier parts, said radiators being operable to dissipate heat, wherein said first amplifier part and said second amplifier part have a same function and are interchangeable on said first and said second sides of said box.

8. An amplifier according to claim 7, wherein one of said first and second amplifier parts is being used and another of said first and second amplifier parts is a backup.

9. An amplifier according to claim 8, wherein said amplifier is operable to be placed outdoors at a high position in order to amplify a radio wave of a portable telephone system.

10. An amplifier according to claim 7, wherein said box has a bottom side, said bottom side of said box being operable to receive a plurality of connectors.

* * * * *